Figure 6:
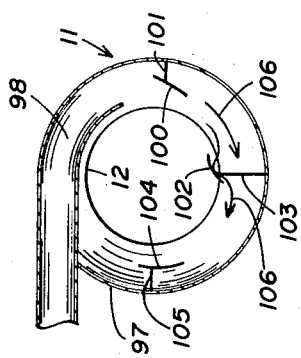

United States Patent

Mueller

[15] 3,705,710
[45] Dec. 12, 1972

[54] SOLIDS FEEDER SYSTEM
[72] Inventor: Frederick N. Mueller, Dallas, Tex.
[73] Assignee: Tetradyne Corporation, Dallas, Tex.
[22] Filed: June 7, 1971
[21] Appl. No.: 150,543

[52] U.S. Cl. ................. 259/151, 222/145, 259/165, 302/39
[51] Int. Cl. .............................................. B28c 5/06
[58] Field of Search ...... 259/147, 151, 165, 161, 162; 222/132, 135, 145, 195; 302/39

[56] References Cited

UNITED STATES PATENTS

| 1,534,008 | 4/1925 | Bongardt | 259/147 |
| 1,663,206 | 3/1928 | MacRae | 259/161 X |
| 1,953,091 | 4/1934 | Westberg et al. | 259/151 |

FOREIGN PATENTS OR APPLICATIONS

| 390,257 | 4/1933 | Great Britain | 259/151 |

Primary Examiner—Walter A. Scheel
Assistant Examiner—Philip R. Coe
Attorney—Richards, Harris & Hubbard

[57] ABSTRACT

A system is provided for dispensing and delivering particulate material which includes an upright hopper with continuous sidewalls converging to a generally elongated outlet at the bottom, an endless conveyor belt positioned to move across the outlet which carries a series of upright cleat members. A housing enclosing the conveyor belt, and an air flow channel extending transversely through the housing and between adjacent cleats as they move past the air flow channel to thereby transmit solids therefrom which are entrapped between adjacent cleats as the belt moves across the hopper outlet. A preferred system is provided which includes one or more of such solids dispensing and delivery systems for transmitting components of a settable cementitious mixture to a suitable cement mixing zone via a gas stream.

4 Claims, 6 Drawing Figures

PATENTED DEC 12 1972

3,705,710

SHEET 3 OF 3

INVENTOR:
FREDERICK N. MUELLER

Richards, Harris & Hubbard
ATTORNEYS

SOLIDS FEEDER SYSTEM

This invention relates to the handling of particulate solids materials.

In another aspect, this invention relates to a novel apparatus for feeding particulate solids into an airstream.

In still another aspect, this invention relates to a novel method and apparatus for delivering components of a settable concrete mixture to a concrete mixing zone.

Conventional systems for metering solid particulate material into a fluid stream include a solids hopper having a rotary multi-vane feeder positioned at its outlet. Examples of such conventional feeders are disclosed in U.S. Pat. Nos. 2,816,693; 3,206,245; and 3,291,536.

Such feeder equipment normally includes an enclosed chamber which communicates with the lower outlet of the solids hopper and carries a spindle rotatably mounted therein which in turn carries a series of outwardly extending vanes. The compartments formed by adjacent vanes rotate about the spindle from the upper position adjacent the outlet of the hopper to a lower position in communication with a fluid conduit. The major disadvantage when utilizing such conventional feeder equipment is that (1) it is usually only effective for delivering smaller particulate materials such as powdered material for flowing through a stream, and (2) it must be utilized with a hopper which has very sharply angled sidewalls which converge to a rather small outlet to avoid static areas of non-flow in the hopper. Because of the latter disadvantage, the hoppers which are utilized with such equipment must necessarily have relatively small hoppers, and secondary feeder systems for these hoppers are necessary when handling larger volumes of particulate materials.

Therefore, one object of this invention is to provide a novel apparatus for dispensing and delivering solid particulate materials.

Another object of this invention is to provide a novel apparatus for dispensing and delivering various sizes of particulate material such as any conventional size aggregate for concrete.

It is a further object of this invention to provide a novel means of dispensing and delivering constituents of a cementitious mixture to a mixer therefor.

According to the invention, a particulate solids dispensing and delivering unit is provided which comprises an upright solids dispensing hopper having sidewalls which converge to a generally elongated outlet at the bottom thereof with an endless conveyor belt positioned to move transversely to the outlet which carries a series of outwardly extending cleats from the conveying surface, a housing enclosing the endless belt exterior of the hopper, and an air delivery channel passing through the housing at a point which transverses the conveyor surface of the belt between adjacent cleats as they move therepast.

According to a preferred embodiment of this invention, one or more of the above-described particulate solids dispensing and delivering systems are incorporated into a concrete delivery system in a manner so that they deliver suitable particulate components for a settable cementitious mixture to an airstream which is directed to a mixing zone for the concrete constituents.

This invention can be more easily understood from a study of the drawings in which:

FIG. 1 is a schematic illustration of a concrete placement truck which utilizes the solids dispensing and delivery system of this invention;

FIG. 2 is a schematic side elevational view partially in section of the delivery vehicle shown in FIG. 1;

FIG. 3 is a schematic end elevational view partially in section of the vehicle of FIG. 2;

FIG. 4 is a schematic view of the delivery system of the vehicle of FIG. 2;

FIG. 5 is an elevational view partially in section of the concrete mixing and delivery unit illustrated in FIG. 1; and FIG. 6 is a sectional view along lines 6—6 of FIG. 5.

Now referring to FIG. 1, a concrete delivery truck which carries the solids dispensing and delivery unit of this invention therein is illustrated in perspective. Truck 10 is adapted to deliver a settable cementitious mixture via a gas stream, preferably an airstream to concrete mixing and delivery unit 11. Concrete mixing and delivery unit 11 functions to thoroughly blend the constituents of the cementitious mix and decelerate them to thereby allow them to drop from the lower outlet 12 thereof. Fluid-solids conduit 13 operatively communicates from fluid-solids delivery means contained within truck 10 to the inlet of concrete mixing and delivery unit 11 and thereby passes a mixture of cement such as Portland cement and suitable aggregate entrained in an airstream, through water injector 14 wherein the requisite amount of water which is supplied via conduit 15 is injected into the fluid-solids stream, and then into the inlet of concrete mixing and delivery unit 11.

Thus, truck 10 contains an air supply unit; solids feeder units, including the solids feeder unit of the subject invention, communicating with conduit 13; and a water supply unit communicating with conduit 15. Both fluid-solids conduit 13 and water supply conduit 15 are carried by extendable boom 16.

Extendable boom 16 can be any suitable extendable boom known in the art, such as the three section boom comprising sections 17, 18 and 19, which are operated by hydraulic cylinders 20 and 21, 22, and 23, respectively, which are controlled by a conventional hydraulic system operable by the truck driver.

The body of truck 10 is equipped with suitable material loading means including cement loading port 24; aggregate loading openings 25 and 26, and water loading port 27.

Concrete mixing and delivery unit 11 includes handles 28 adapted for manipulation by a workman to thereby hold unit 11 above the concrete placement point. In addition, eye 29 is carried on a top portion of unit 11 to cooperate with hook 30 on the end of section 19 of extendable boom 16 to thereby allow concrete mixing and delivery unit 11 to be remotely positioned over the desired placement point by the action of boom 16.

Now referring to FIGS. 2 and 3, the concrete delivery system carried by truck 10 including the solids dispensing and delivery unit of the subject invention is shown in detail. As illustrated in FIG. 3, cement loading port 24 operatively communicates with cement hopper 32, and water loading port 27 operatively communicates with water tank 33. Aggregate loading opening 25 comprises the upper portion of rock hopper 34, which is an integral part of solids dispensing and delivery unit 35 of the subject invention adapted to dispense and deliver rock to the airstream communicating with fluid-solids delivery conduit 13. In similar manner, aggregate loading opening 26 comprises the upper portion of sand hopper 36, which is an integral part of solids dispensing and delivery unit 37 of the subject invention which functions to dispense and deliver sand to the airstream directed to fluid-solids delivery conduit 13.

Cement hopper 32 comprises a conventionally shaped cement hopper wherein the sidewalls converge to the bottom section 38 which is smaller in cross-sectional area than the upper inlet portion of hopper 32. The bottom section 38 of cement hopper 32 opens directly into feeder unit 40. Feeder unit 40 comprises an enclosed vane-type feeder which includes several vanes 41 mounted upon a spindle 42 which rotates within an enclosed housing which in turn communicates between cement hopper 32 and cement receiving manifold 43. A suitable such cement feeder unit includes the rotary air lock feeder unit sold under the trademark of ROTO–FLO by Wm. W. Meyer & Sons, Inc., of Skokie, Illinois. Thus, the speed at which spindle 42 rotates will control the amount of cement which is delivered to cement receiving manifold 43. The speed control for spindle 42 will be discussed in detail below.

Figure 2:
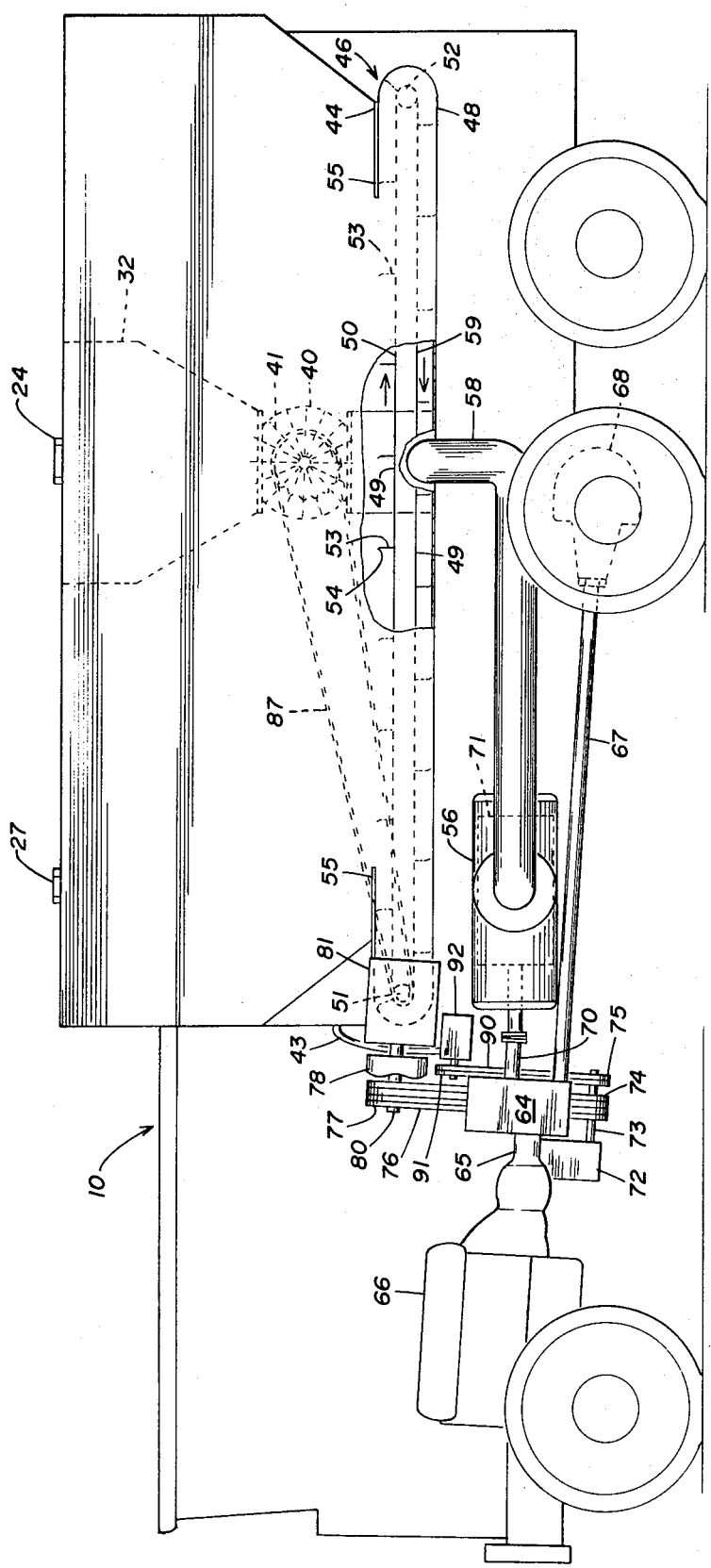

Rock hopper 34 and sand hopper 36 each comprise four sidewalls which converge to elongated rectangular-shaped bottom sections 44 and 45, respectively. Solids feeder sections 46 and 47 join bottom sections 44 and 45 of hoppers 34 and 36, respectively. It is noted that solids feeder sections 46 and 47 have the same basic components and function generally in an identical manner and thus, will be described specifically in relation to solids feeder section 46 as illustrated in FIG. 2. The identical components of solids feeder sections 46 and 47 are identified by the same arabic characters except those of solids feeder section 47 are followed by the letter *a*.

As illustrated, solids feeder section 46 comprises shroud 48, which is a housing positioned around endless belt 50 such that the sides thereof are positioned a fixed distance from the conveying surface 49 of endless belt 50. Endless belt 50 is movably mounted over rollers 51 and 52. Furthermore, endless belt 50 carries a series of upright cleats 53, each carrying a resilient tip 54, which makes sealing contact between endless belt 50 and shroud 48. As shown, shroud 48 extends completely around endless belt 50 externally of hopper 34, making sealing contact with resilient tips 54 of each upright cleat 53. In addition, extensions 55 of shroud 48 extend into rock hopper 34 a short distance at the points wherein endless belt 50 enters and exits from the rectangular shaped bottom section 44 thereof.

Figure 3:
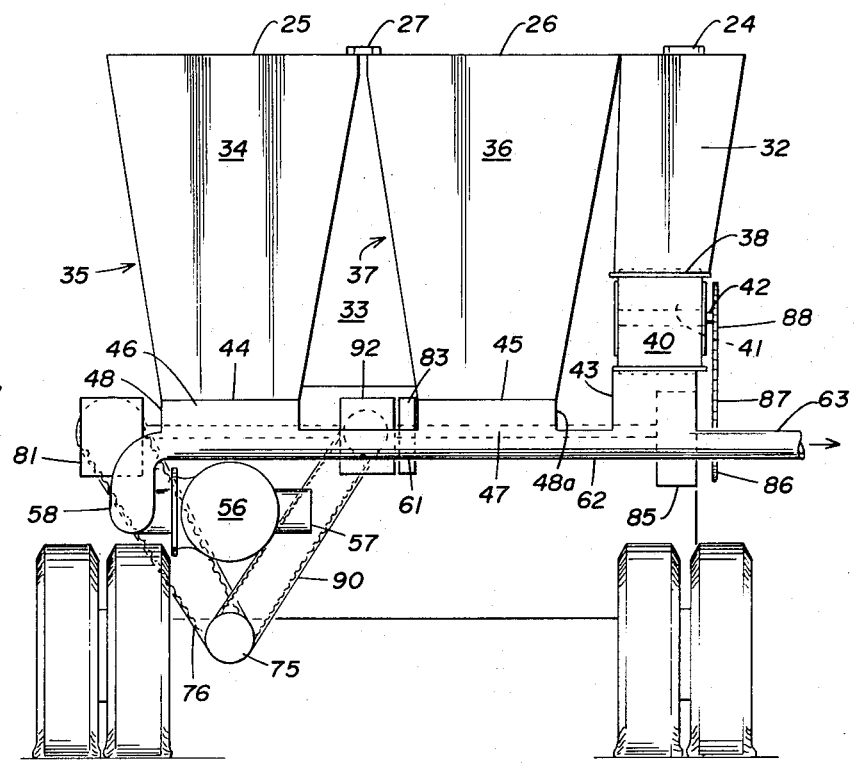

Now referring to FIGS. 2 and 3, air blower 56 is positioned under solids dispensing and delivery unit 35 and carries air inlet 57 and air delivery conduit 58 which operatively communicates from the outlet of air blower 56 to the lower middle portion of shroud 48 of solids dispensing and delivery unit 35.

Air delivery conduit 58 operatively communicates through the lower middle sidewall of shroud 48 at a point between the lower returning portion 59 of endless belt 50 and the bottom section of shroud 48. Conduit 61 communicates between shroud 48 of solids feeder section 46 and shroud 48a of solids feeder section 47 opposite the point that air delivery conduit 58 communicates with shroud 48. Thus, conduit 61 communicates with shroud 48a in exactly the same manner that air delivery conduit 58 communicates with shroud 48. In this manner an air flow path is provided from air delivery conduit 58 through the lower middle sidewalls of shroud 48, and then to the lower middle sidewall portion of shroud 48a via conduit 61. Conduit 62 communicates from the lower middle sidewall of shroud 48a at a point opposite the place of connection of conduit 61 to cement receiving manifold 43. Therefore, a flow path is provided from air delivery conduit 58 through the lower middle sidewall portion of shroud 48 below the lower portion 59 of endless belt 50 and into conduit 61; from conduit 61 through the lower portion of shroud 48a and under the lower portion 59a of endless belt 50 contained therein; from shroud 48a to conduit 62; and from conduit 62 through cement receiving manifold 43 to air solids manifold conduit 63.

Figure 4:
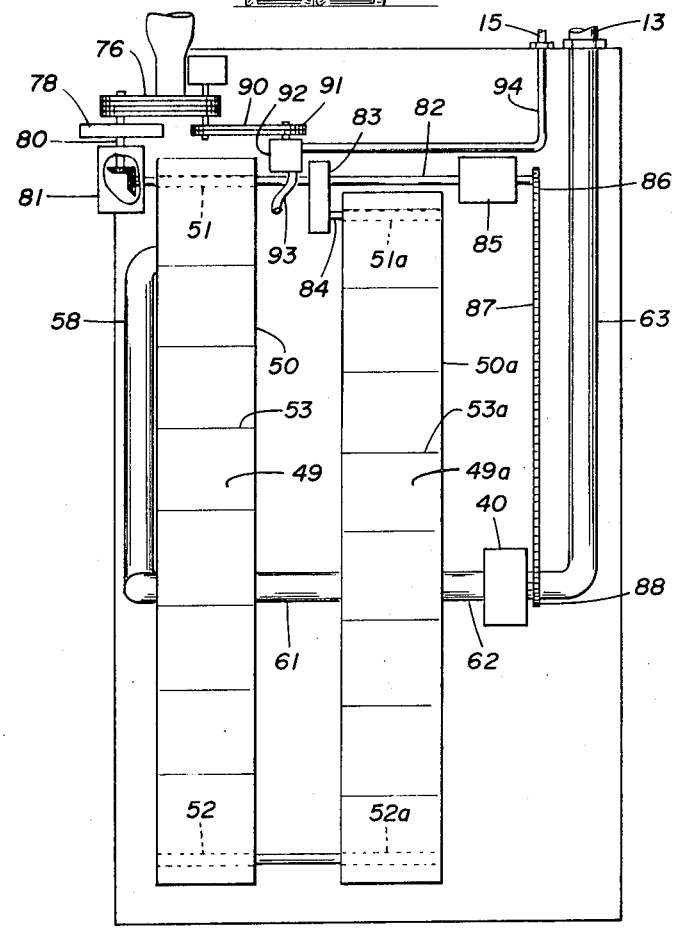

Now referring to FIGS. 2–4, the power connections to the solids feeder sections 46 and 47, air blower 56 and the water supply unit in truck 10 will be explained in detail. As shown, transfer case 64 from drive shaft 65 of engine 66 operatively communicates via driveshaft 67 to differential joint 68 for providing power to the rear wheels of vehicle 10, and also to air blower 56 via driveshaft 70. Air blower 56 can be any conventional blower mechanism which is powered by rotatable driveshaft 70 and is illustrated as a "Rootes" type blower 71 rotatably mounted within the housing forming the exterior of air blower 56. Transfer case 64 is attached to conventional control mechanism for controlling the engagement and disengagement of driveshaft 70 to the power train.

In addition, conventional power take-off unit 72, for example, a hydraulic power take-off unit is attached to driveshaft 65 from the engine 66. Power take-off unit 72 can be any conventional power take-off unit such as for example, the one manufactured by Spicer Corp. Power take-off unit 72 provides rotating power to a spindle 73 which in turn drives pulleys (timing pulleys) 74 and 75. Timing pulley 74 carries a series of four timing belts 76 which in turn drive pulley 77, which is operatively attached through clutch 78 to the power system for solids dispensing and delivery units 35 and 37, and cement feeder unit 40. Clutch 78 can be any conventional clutch unit which is adapted to be operated by the drive of vehicle 10. Spindle 80 from clutch 78 communicates to right angle gear box 81. Right angle gear box 81 carries a suitable right angle gear mechanism such as a pair of miter gears which transfer rotating power to feeder drive shaft 82. Feeder drive shaft 82 directly drives roller 51 which drives endless belt 50. In addition, feeder drive shaft 82 communicates through variable speed drive mechanism 83 which operates to drive roller 51a, which in turn drives endless belt 50a. Variable speed drive mechanism 83 can comprise any conventional drive mechanism such as manufactured by Link Belt Corp. under the tradename "PIV" and functions to rotate shaft 84, for drive roller 51a at endless belt 50a. Feeder driveshaft 82 which passes through variable speed drive mechanism 83 functions to operate variable speed drive mechanism 85 for cement feeder 40. Variable speed drive mechanism 85 can be any conventional variable speed mechanism such as variable speed drive mechanism 83 and functions to drive sprocket 86 at a suitable speed. Sprocket 86 drives chain 87, which in turn communicates over sprocket 88 of cement feeder 40 and functions to rotate the feeder vanes 41 therewithin.

In addition to driving timing pulley 74, shaft 73 of power take-off unit 72 also drives timing pulley 75 which drives timing belts 90 that pass over pulley 91 of water pump 92. Water pump 92 communicates with water tank 33 via conduit 93, and with water delivery conduit 15 via conduit 94.

In operation of truck 10, with the engine 66 running, extendable boom 16 is adjusted in a conventional manner so that concrete mixing and delivery unit 11 can be positioned with its outlet 12 directly over a desired concrete placement point. Next, transfer case 64 is engaged so that driveshaft 70 to air blower 56 is energized, thereby causing a continuous stream of air to pass from air conduit 58 through the lower portion of shroud 48, conduit 61, the lower portion of shroud 48a, cement receiving manifold 43, air solids manifold conduit 63 and then to fluid-solids delivery conduit 13. Next, power take-off unit 72 is engaged to thereby impart rotating motion to pulleys 74 and 75 which in turn imparts rotating motion to pulley 77 and pulley 91 which drives water pump 92. Clutch 78 is engaged to cause rotation of feeder driveshaft 82, thereby causing the rotation of roller 51 and the subsequent movement of endless belt 50 carrying cleats 53 across the bottom of rock hopper 34. Similarly, driveshaft 84 is energized causing the rotation of roller 51a and the subsequent movement of endless belt 50a, causing cleats 53a to move across the bottom of sand hopper 36. Also, sprocket 86 is actuated causing the movement of sprocket 88 and the subsequent rotation of vanes 41 in cement feeder unit 40. This action causes rocks to be entrapped between cleats 53 and carried under shroud 48 and adjacent the outlet of conduit 58. Air passing from conduit 58 is maintained at a solids entraining velocity sufficient to entrain the rocks entrapped between adjacent cleats 53 and then pass them into conduit 61. In similar manner, sand is entrapped between cleats 53a as they pass across the bottom of sand hopper 36 and under shroud 48a. The air containing the entrained rocks passes from conduit 61 through adjacent cleats 53a within shroud 48a and entrains the sand therewithin to yield an air-sand-rock stream which is delivered to conduit 62. The vanes 41 of cement feeder 40 deposit the requisite amount of the dry Portland cement into the cement receiving manifold 43. This cement is entrained in the air-sand-rock stream to form a combined air-solids stream which is delivered into air-solids manifold conduit 63 which in turn delivers the mixture to fluid-solids conduit 13 which operatively communicates with concrete mixing and delivery unit 11. The rotation of endless belts 50 and 50a within solids feeder sections 46 and 47, respectively, and the rotation of vanes 41 within cement feeder unit 40 are synchronized such that a suitable ratio of rock-to-sand-to-cement is delivered through the airstream passing to conduit 10. A suitable such ratio with an air velocity of from 75 to 200 feet per second includes a weight ratio of cement-to-sand-to-rock, for example, of about 1:3:3.7. The composition of the concrete mixture being delivered is adjusted by varying the speed of the sand and cement to water feeder system, with respect to the rock system. It is well understood that one skilled in the art can alter the ratio between air, cement, and aggregate in any suitable manner to provide the desired cementitious mix.

Simultaneously, actuation of water pump 92 by belts 90 results in water flow passing from conduit 93 to conduit 94 which is in communication with water delivery conduit 15. Water delivery conduit 15 in turn delivers suitable amounts of water to water injector 14 which uniformly injects water into the fluid-solids stream flowing through conduit 13. With the weight ratios as set forth above, water can be injected into such stream in amounts as required to produce the desired concrete consistency. The fluid-solids stream passing from water injector 14 is passed into the inlet of concrete mixing and delivery unit 11.

As explained above, concrete mixing and delivery unit 12 is provided with means for imparting a decelerating and turbulent mixing action to the fluid-solids streams delivered into the inlet thereof to thereby impart blending action to the constituents of said stream while decelerating the constituents to approximately their "gravitational velocity." It is herein understood that the term "gravitational velocity" as used herein is a velocity which is substantially the same as that solely attributed to the acceleration of gravity acting upon the slurry which is admixed within unit 11. The fluid-solids stream is decelerated and thoroughly mixed within unit 11 and allowed to drop from the outlet 12 thereof upon the predetermined placement point.

Figure 5:
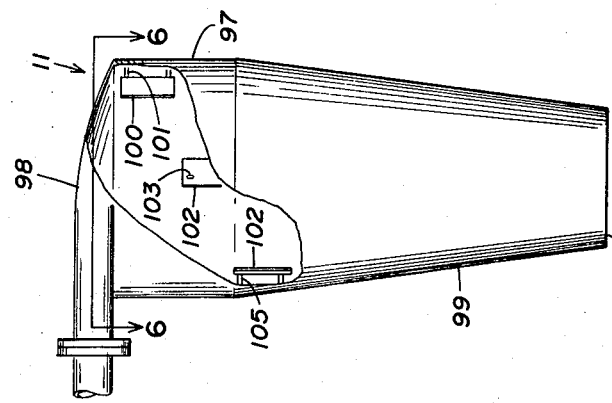
Figure 1:
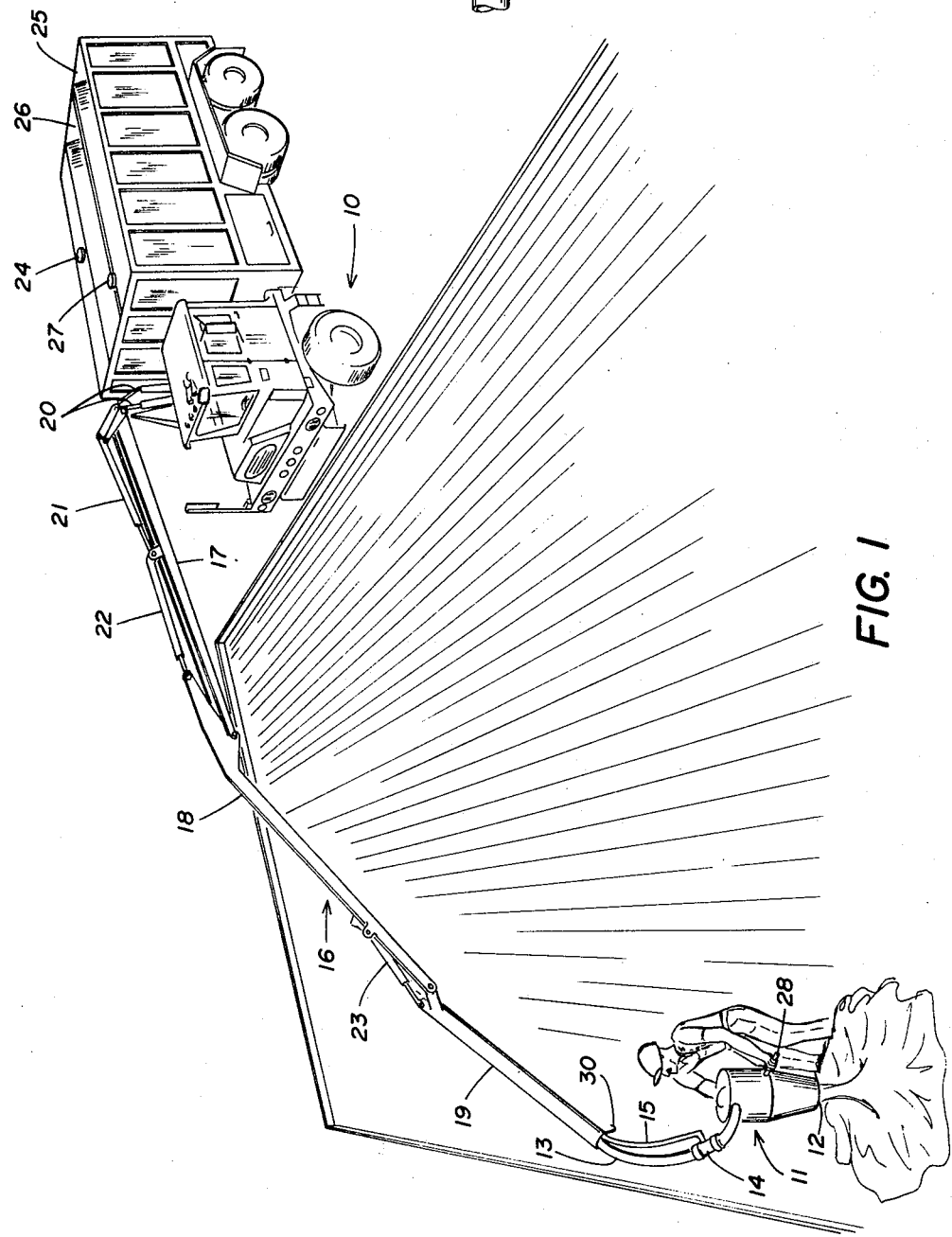

FIG. 5 is an elevational view partly in section of a concrete mixing and delivery unit 11. As shown, concrete mixing and delivery unit 11 comprises a top cylindrical section 97, which is enclosed at its upper end and carries tangential inlet 98 in operative communication therewith and a lower frusto-conical section 99 which communicates with the bottom of cylindrical section 97. A series of flow control baffles is positioned in the flow path of the fluid-solids stream emitted by tangential inlet 98. The stream normally will travel in a spiral path downwardly in concrete mixing and delivery unit 11. The position of the flow control baffles is illustrated in FIG. 5 and FIG. 6, which is a sectional view taken along lines 6—6 of FIG. 5. As illustrated, baffle 100 is generally a curved blade positioned at the outlet of tangential inlet 98 within cylindrical section 97. Baffle 100 is suspended therewithin by support members 101, which extend from the walls of cylindrical unit 97. Baffle 102 is positioned in the spiral flow path at a point further around the circumference of cylindrical unit 97 (approximately 90° from baffle 100.) Baffle 102 is generally arcuately shaped and positioned to deflect the fluid-solids stream outwardly toward the periphery of cylindrical unit 97. Baffle 102 is suspended within the interior of cylindrical unit 97 by support members 103. As shown, frusto-conical section 99 which operatively communicates at its wider end with the lower portion of cylindrical section 97 converges to a narrower outlet 12. Baffle 104 is generally arcuately shaped and is positioned approximately 180° from baffle 102. Baffle 104 is suspended from the sides of cylindrical section 97 and frusto-conical section 99 by support members 105, and functions to divide the fluid-solids stream and enhance the mixing action thereof. The actions of baffles 100, 102 and 104 within the concrete mixing and delivery unit 11 will thereby function to direct the fluid-solids stream in a generally spiral downward path toward outlet 12 as shown by flow arrows 106 and cause deceleration and blending of the components thereof.

Typical operating parameters which can be utilized in the scope of this invention include use of an air velocity within conduit 10 of from about 75 to about 150 feet per second which will carry the cementitious solids in a weight ratio of solids to air of about from 5:1 to about 20:1. The cementitious materials can comprise from 3 to 100 weight percent Portland cement and from 97 to 0 weight percent of any suitable size of aggregate (for example sand and/or gravel). In addition, water can be uniformly injected into the fluid-solids stream passing through water injector 14 at a rate to produce about 3 to about 9 gallons per 94 lbs. cement. With such an airstream, a concrete mixing and delivery unit of generally a frusto-conical shape, having a tangential inlet and having an average internal diameter of 1 to 3 feet and being 2 to 4 feet in length depending on delivery rate can be utilized to thoroughly admix such streams, decelerate them to substantially their "gravitational velocity" and deposit them as they fall from outlet 12.

While this invention has been described in relation to its preferred embodiments, it is to be understood that various modifications thereof will now be apparent to one skilled in the art upon reading this specification, and it is intended to cover such modifications as fall within the scope of the appended claims.

I claim:

1. An apparatus for delivering a settable cementitious mixture to a placement point comprising:
   a. an aggregate feeder including:
      1. an upright solids dispensing hopper with continuous sidewalls converging to an outlet at the bottom thereof;
      2. an endless conveyor belt positioned on roller members which move conveyor surfaces transversely of said outlet;
      3. a housing member enclosing said endless conveyor belt externally of said hopper and being spaced a fixed distance from the conveyor surfaces of said belt;
      4. a series of cleat members attached to the conveyor surfaces of said endless belt and extending outwardly therefrom, the outer tips thereof carrying resilient sealing sections adapted to be sealably engaged with said housing as said endless belt moves therewithin to form a series of solids transfer chambers between adjacent cleats; and
      5. an air flow channel having an inlet and an outlet on opposite sides, respectively, of said housing member and thereby communicating through a section of said housing and transversely through said solids transfer chambers as they move through said section;
   b. an air blower means having an air inlet and an air outlet, and first conduit means communicating between said air outlet and the inlet of said air flow channel through said housing;
   c. second conduit means communicating between said air outlet of said air flow channel through said housing and a cement dispensing means for dispensing a settable cement material therewithin;
   d. third conduit means communicating from said cement dispensing means to a water injector for injecting water therewithin;
   e. fourth conduit means communicating between said water injector and a mixing chamber for decelerating and mixing water, aggregate, and cement material entrained in an air stream.

2. The apparatus of claim 1 further comprising a second of said aggregate feeder units having a second said flow channel operatively positioned within said second conduit means.

3. The apparatus of claim 1 wherein said mixing chamber comprises an enclosed chamber having continuous sidewalls carrying an outlet at the lower end thereof with the fluid-solids inlet communicating with an upper enclosed end thereof.

4. The apparatus of claim 3 wherein said mixing chamber comprises an enclosed cylindrical upper section carrying a tangential fluid-solids inlet therefor and being in operative communication with the widened end of an inverted frusto-conical section having said outlet at the apex thereof.

* * * * *

PO-1050
(5/69)

UNITED STATES PATENT OFFICE
CERTIFICATE OF CORRECTION

Patent No. 3,705,710                     Dated December 12, 1972

Inventor(s) Frederick N. Mueller

It is certified that error appears in the above-identified patent and that said Letters Patent are hereby corrected as shown below:

Col. 1, line 15 "3,206,245" should be --3,206,254--.

Signed and sealed this 22nd day of May 1973.

(SEAL)
Attest:

EDWARD M. FLETCHER, JR.                  ROBERT GOTTSCHALK
Attesting Officer                        Commissioner of Patents